(12) United States Patent
Jesurum

(10) Patent No.: US 10,496,702 B2
(45) Date of Patent: Dec. 3, 2019

(54) SYSTEM INTEGRATOR AND METHOD FOR MAPPING DYNAMIC COBOL CONSTRUCTS TO OBJECT INSTANCES FOR THE AUTOMATIC INTEGRATION TO OBJECT-ORIENTED COMPUTING SYSTEMS

(71) Applicant: Aurea Software, Inc., Austin, TX (US)

(72) Inventor: Caroline Esther Jesurum, Needham, MA (US)

(73) Assignee: Aurea Software, Inc., Austin, TX (US)

( * ) Notice: Subject to any disclaimer, the term of this patent is extended or adjusted under 35 U.S.C. 154(b) by 3 days.

(21) Appl. No.: 15/799,312

(22) Filed: Oct. 31, 2017

(65) Prior Publication Data

US 2018/0052944 A1 Feb. 22, 2018

Related U.S. Application Data

(63) Continuation of application No. 15/355,880, filed on Nov. 18, 2016, now Pat. No. 9,817,917, which is a continuation of application No. 14/858,834, filed on Sep. 18, 2015, now Pat. No. 9,519,462, which is a continuation of application No. 14/058,474, filed on
(Continued)

(51) Int. Cl.
| | | |
|---|---|---|
| *G06F 17/00* | (2006.01) | |
| *G06F 16/84* | (2019.01) | |
| *G06F 8/30* | (2018.01) | |
| *G06F 8/36* | (2018.01) | |
| *G06F 8/20* | (2018.01) | |
| *G06F 8/35* | (2018.01) | |

(52) U.S. Cl.
CPC ............... *G06F 16/86* (2019.01); *G06F 8/24* (2013.01); *G06F 8/315* (2013.01); *G06F 8/35* (2013.01); *G06F 8/36* (2013.01)

(58) Field of Classification Search
CPC ......... G06F 17/30289; G06F 17/30345; G06F 17/3053; G06F 17/303; G06F 17/30864
See application file for complete search history.

(56) References Cited

U.S. PATENT DOCUMENTS

2002/0056012 A1* 5/2002 Abileah ............... G06F 8/20
719/310

OTHER PUBLICATIONS

Notice of Allowance dated Jul. 11, 2017, mailed in U.S. Appl. No. 15/355,880, pp. 1-55.
(Continued)

*Primary Examiner* — Truong V Vo

(57) ABSTRACT

A system integrator for modeling an object instance of a COBOL data set, the object instance including representations of OCCURS DEPENDING ON clauses or REDEFINE clauses. The system comprises a client interface module, an import module, an object model module and modeler module. The client interface module generates an interface and receives a copybook selection and a set of REDEFINE criteria. The import module receives the copybook selection and imports a copybook from a database. The object model module receives the copybook and the set of REDEFINE criteria, and creates a customized object model for the copybook. The modeler module receives the customized object model and a set of COBOL data, and forms an object instance equivalent to the set of COBOL data, the object instance including representations of a OCCURS DEPENDING ON clause or REDEFINE clause.

27 Claims, 14 Drawing Sheets

Related U.S. Application Data

Oct. 21, 2013, now Pat. No. 9,152,387, which is a continuation of application No. 13/605,532, filed on Sep. 6, 2012, now Pat. No. 8,566,277, which is a continuation of application No. 13/358,402, filed on Jan. 25, 2012, now Pat. No. 8,290,897, which is a continuation of application No. 12/324,061, filed on Nov. 26, 2008, now Pat. No. 8,145,597.

(60) Provisional application No. 61/047,523, filed on Apr. 24, 2008.

(56) References Cited

OTHER PUBLICATIONS

Terminal Disclaimer and Terminal Disclaimer Approval dated Jun. 22, 2017, in U.S. Appl. No. 15/355,880, pp. 1-4.
Response to Non-Final Rejection dated Mar. 22, 2017, U.S. Appl. No. 15/355,880, filed Jun. 22, 2017, pp. 1-9.
Non-Final Rejection dated Mar. 22, 2017, mailed in U.S. Appl. No. 15/355,880, pp. 1-34.

* cited by examiner

SYSTEM INTEGRATOR AND METHOD FOR MAPPING DYNAMIC COBOL CONSTRUCTS TO OBJECT INSTANCES FOR THE AUTOMATIC INTEGRATION TO OBJECT-ORIENTED COMPUTING SYSTEMS

CROSS REFERENCE TO RELATED APPLICATIONS

The present application is a continuation of U.S. application Ser. No. 13/358,402, entitled "A System Integrator and Method for Mapping Dynamic COBOL Constructs to Object Instances for the Automatic Integration to Object-Oriented Computing Systems," filed on Jan. 25, 2012, which is a continuation of U.S. application Ser. No. 12/324,061, entitled "A System Integrator and Method for Mapping Dynamic COBOL Constructs to Object Instances for the Automatic Integration to Object-Oriented Computing Systems," filed on Nov. 26, 2008, both of which are incorporated herein by reference.

This application claims priority under 35 U.S.C. § 119(e) from U.S. Provisional Patent Application No. 61/047,523, entitled "A Model Driven Approach to Mapping Dynamic COBOL Constructs into Hierarchical Objects," filed Apr. 24, 2008, which is incorporated by reference herein in its entirety.

BACKGROUND OF THE INVENTION

1. Field of the Invention

The present invention relates to the field of integration of legacy computer data. In particular, the present invention relates to model driven design, and specifically, to the field of data integration of legacy COBOL data structures including dynamic COBOL clauses to object instances for object-oriented computing systems.

2. Description of the Background Art

In recent years, the need has arisen to integrate legacy COBOL data sets stored across one or more COBOL mainframe computing systems to one or more object-oriented computing systems. However, prior art approaches of integrating legacy COBOL data sets stored on legacy COBOL mainframe computing systems to object-oriented computing systems have numerous problems that remain unresolved.

One prior art approach to integrating legacy COBOL data sets operable on COBOL mainframe computing systems to object-oriented computing systems involves transforming the legacy COBOL data sets to an intermediate object-oriented form. Generally, this approach involves extracting a legacy data set from a mainframe database, transforming the extracted legacy data set to an object-oriented form (e.g., an intermediate of XML form), and then loading the transformed object-oriented data set to a unified repository. The transformed data sets can then be accessed and consumed by object-oriented applications having access to the unified repository. However, this prior art approach is time consuming and expensive.

The prior art approach has numerous additional problems. One problem is that the prior art approach is unable to properly represent instances of OCCURS DEPENDING ON clauses without requiring a human programmer to write custom code for each instance of OCCURS DEPENDING ON. Briefly explained, the COBOL programming language allows the programmer to specify COBOL data structures to be manipulated by the COBOL program. The data structure is defined in a COBOL copybook. The copybook is organized by levels. Level 1 is reserved for the 'root' data structure or 'group'. Generally a given file will contain the data for a single level 1 group. A level N group will contain members (fields or sub-groups) at a level M>N (where M is equal to a member level and N is equal to a group level). Members can be defined as level 2 through 49. Each member can optionally declare its number of occurrences (or cardinality) via an OCCURS clause. One feature in COBOL is the OCCURS DEPENDING ON clause, which causes fields or groups to be repeated a variable number of times. Because OCCURS DEPENDING ON clauses cause fields or groups to be repeated a variable number of times, these clauses have the potential to dramatically affect the size of COBOL files. It is therefore important that solutions for integrating legacy COBOL data sets to object-oriented systems properly represent instances of OCCURS DEPENDING ON clauses.

However, the prior art approach is generally unable to identify the controlling field for OCCURS DEPENDING ON clauses or determine the value for each controlling numeric field. The prior art approach is therefore unable to properly represent OCCURS DEPENDING ON clauses without the undue expense of requiring a human programmer to write custom code for each instance of OCCURS DEPENDING ON.

Another problem associated with the above described prior art approach is its inability to properly represent instances of REDEFINE clauses without the undue expense of requiring a human programmer to write custom code for each instance of REDEFINE. The problem with REDEFINE clauses is similar to the problem described above for OCCURS DEPENDING ON clauses. Briefly explained, REDEFINE clauses are generally used as space saving tools. For example, a sales record database might store customer information. When the customer is an organization, its name field might be a single string field of length 80. However, when the customer is an individual, the name field is REDEFINED as a group with a first name (string of length 39), a middle initial (string of length 1) and a last name (string of length 40). However, the above described prior art approaches are unable to identify the stated definitions for REDEFINE clauses. In fact, the COBOL language has no way to declare the discriminant for a REDEFINED member. In the previous example, whether the customer is an individual or an organization is the discriminant for deciding which definition of "name" to use. As a result, the prior art approach is unable to properly represent REDEFINE clauses without the undue expense of requiring a human programmer to write custom code for each instance of REDEFINE.

SUMMARY OF THE INVENTION

The present invention overcomes the deficiencies and limitations of the prior art by providing a system integrator and method for mapping dynamic COBOL constructs to object instances for the automatic integration to object-oriented computing systems. In one embodiment, a computing system includes a client having a system integrator communicatively coupled to a COBOL mainframe. In particular, the system integrator includes a client interface module, an import module, an object model module and a modeler module. The client is communicatively coupled either directly or indirectly to one or more COBOL mainframes. Each COBOL mainframe comprises one or more database(s). Each database includes a plurality of COBOL data sets and a plurality of COBOL copybooks. Each COBOL data set includes a plurality of COBOL fields, a plurality of COBOL groups and at least one instance of either an OCCURS DEPENDING ON clause or a REDEFINE clause. Each COBOL copybook includes definitions for a subset of the COBOL groups. Thus, each COBOL copybook includes all the metadata necessary for building an object model for the subset of COBOL groups defined by the COBOL copybook.

The client interface module receives a COBOL copybook selection and a set of REDEFINE criteria from the client. The import module receives the copybook selection from the client interface module. The import module then imports the selected COBOL copybook from one of the databases. The object model module receives the COBOL copybook from the import module and generates an object model for a subset of the COBOL groups. The object model module then receives the REDEFINE criteria from the client interface module and creates a customized object model based on the REDEFINE criteria and the previously generated object model. The object model module then stores the customized object model on a computer-readable storage medium. The modeler module receives a COBOL data set from one of the databases. The modeler module then accesses the computer readable storage medium at runtime and retrieves the customized object model corresponding to the COBOL data set. Next the modeler module organizes the received COBOL data set to automatically form an object instance of the COBOL data set based on the customized object model. The object instance includes proper representations for all instances of OCCURS DEPENDING ON clauses and REDEFINE clauses without the requirement for custom coding.

The present invention also includes methods for mapping dynamic COBOL constructs (e.g., OCCURS DEPENDING ON and/or REDEFINE clauses) to object instances.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
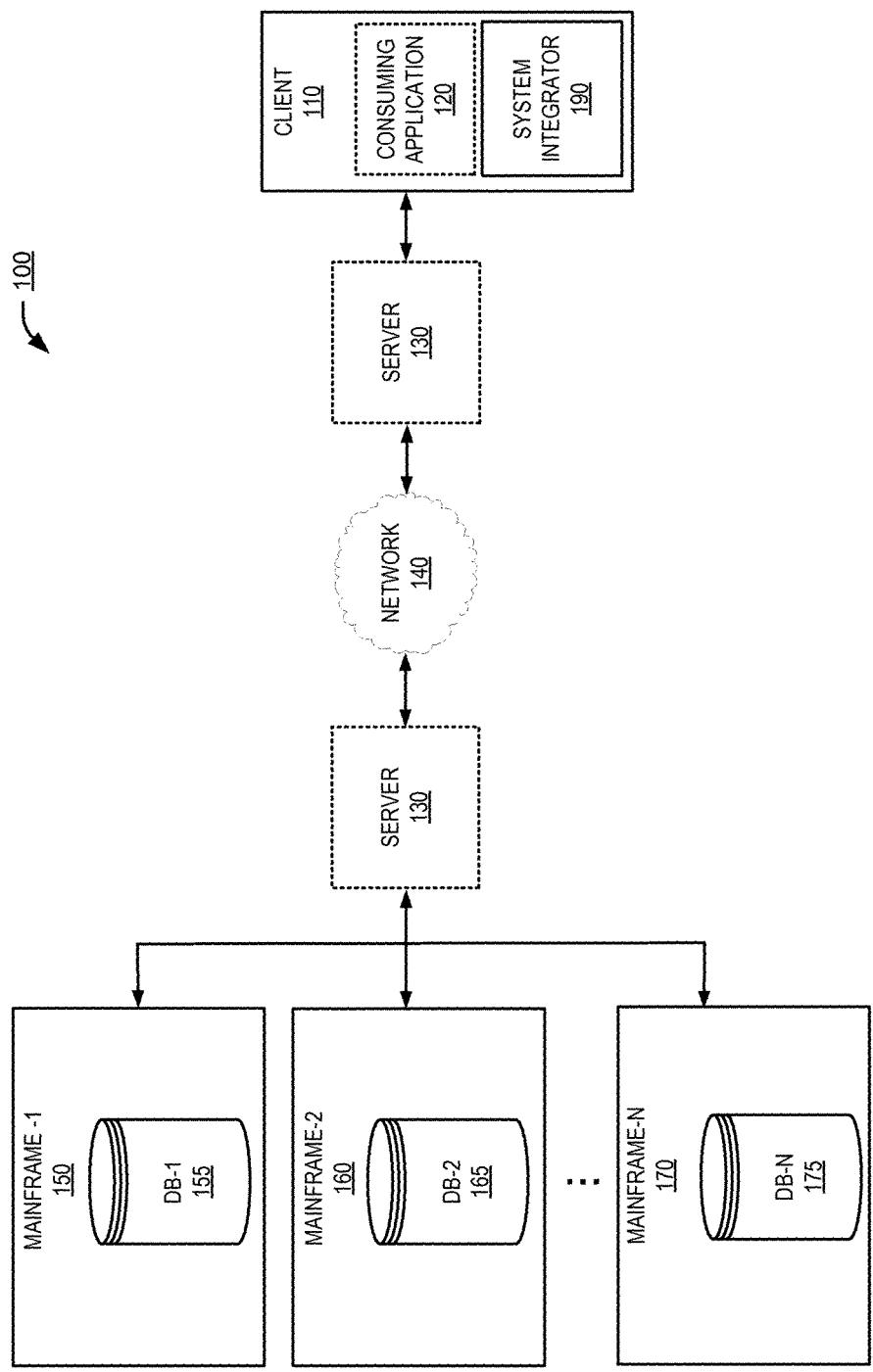
FIG. 1 is a block diagram of an example computing system including one embodiment of the present invention.

A system integrator and method for mapping dynamic COBOL constructs to object instances for the automatic integration to object-oriented computing systems is described.

Reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

The present invention also relates to an apparatus for performing the operations herein. This apparatus may be specially constructed for the required purposes, or it may comprise a general-purpose computer, including a processor, memory, non-volatile storage, an input device, an output device and a tangible storage medium, selectively activated or reconfigured by a computer program stored in the computer. Such a computer program may be stored in the tangible computer-readable storage medium, such as, but not limited to, any type of disk including floppy disks, optical disks, CD-ROMs and magnetic optical disks, solid-state storage devices, read-only memories (ROMs), random access memories (RAMs), EPROMs, EEPROMs, magnetic or optical cards, or any type of media suitable for storing electronic instructions, each coupled to a computer system bus.

The present invention also relates to the persistent storage of data in a database or data storage devices. The data storage device may be any suitable non-volatile mass storage device capable of persistently storing data such as but not limited to hard disk drives, solid-state storage devices, optical storage devices, a flash memory devices, magnetic storage devices, etc.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not limited to any particular programming language, API, driver type, and/or specification. It will be appreciated that a variety of programming languages, APIs, driver types, and/or specifications may be used to implement the teachings of the invention as described herein.

System Overview

Figure 2:
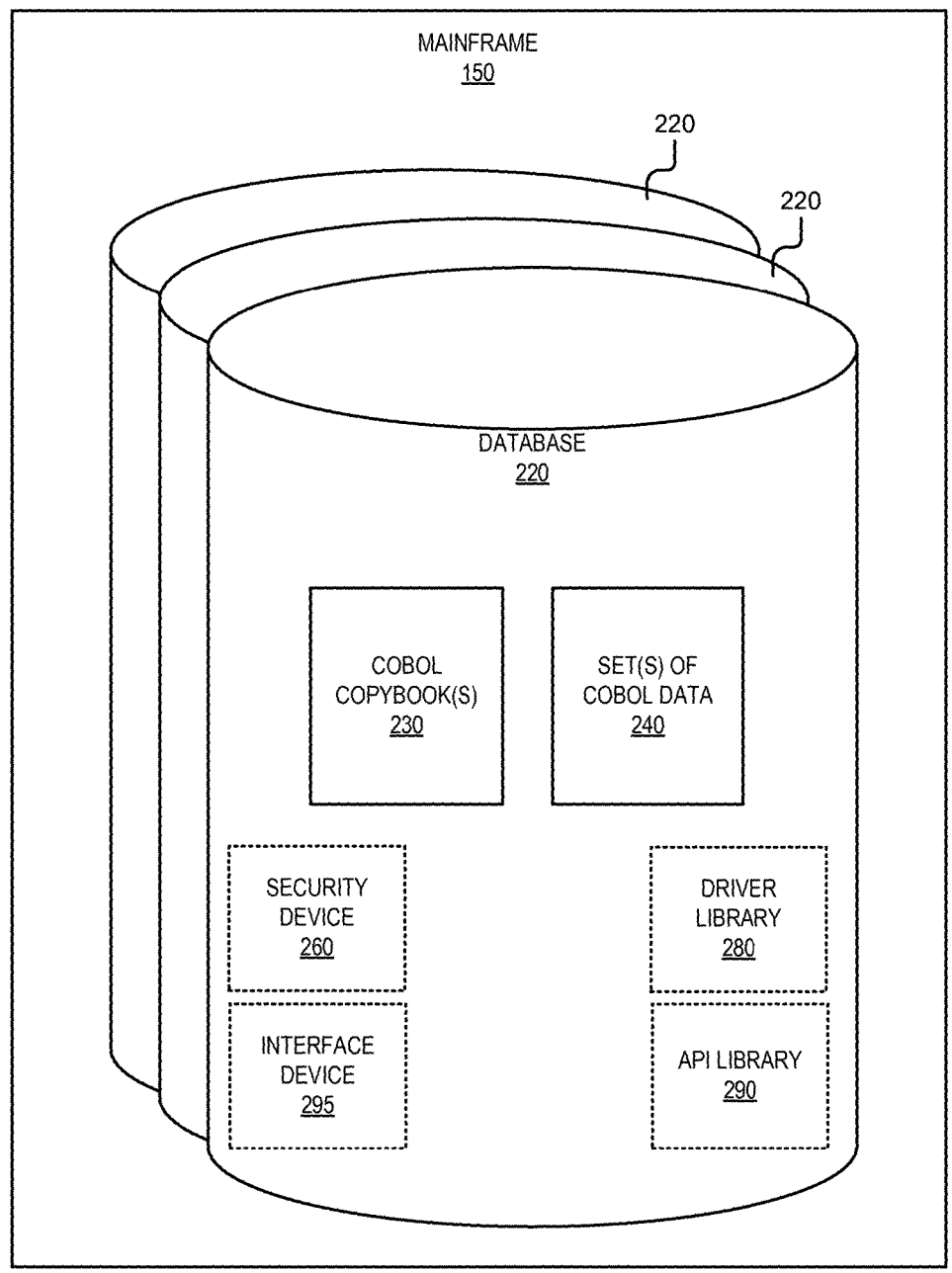
FIG. 2 is a block diagram of an embodiment of a mainframe.

FIG. 1 illustrates a block diagram of a computing system 100 for the present invention comprising a client 110 and a plurality of mainframes 150, 160 and 170. The client 110 is communicatively coupled to the mainframes 150, 160 and 170 in a conventional manner. Although a plurality of mainframes 150, 160 and 170 are shown in FIG. 1, there need only be one. Each mainframe 150, 160 and 170 comprises at least one database 155, 165 and 175 and other features that will be described below and that are illustrated in FIG. 2. In some embodiments, each mainframe 150, 160 and 170 is a computing system including a processor, memory, non-volatile storage, an input device, an output device; and comprises a plurality of databases. More specifically, the mainframes 150, 160 and 170 are mainframe computers.

The client 110 comprises a system integrator 190 and optionally a consuming application 120. The client 110 is also communicatively coupled to the mainframes 150, 160 and 170 via one or more networks 140 and/or one or more servers 130. In one embodiment, the client 110 is a computing system including a processor, memory, non-volatile storage, an input device, and an output device. The client 110 and its components are described in more detail below with reference to FIG. 3.

The network 140 comprises any combination of conventional networks such as a local area network (LAN), a wide area network (WAN), the Internet, an intranet (including, but not limited to, an intranet in an enterprise computing environment), an extranet or other suitable communication system wired or wireless. The network 140 can be secure or unsecure. The network 140 communicatively couples the client 110 to the mainframes 150, 160 and 170. The servers 130 comprises any combination of conventional server types (e.g., database servers, web servers, and/or application servers) and provides any combination of conventional features (e.g., database management systems, tangible computer-readable storage devices, model libraries, driver libraries, API libraries, interface devices, security devices, input peripherals, and/or output peripherals).

At a modeling stage, the system integrator 190 receives a copybook selection and a set of REDEFINE criteria from the client 110. The copybook selection includes information from the client 110 specifying a COBOL copybook import from one of the database(s) 155, 165 and 175. The set of REDEFINE criteria include information from the client 110 specifying rules for evaluating instances of REDEFINE clauses that are identified in a COBOL data set that is received later at runtime from one of the database(s) 155, 165 and 175. The system integrator 190 imports the specified COBOL copybook from one of the database(s) 155, 165 and 175. The database(s) 155, 165 and 175 each have a COBOL data model. The system integrator 190 is configured to generate an object model for each imported COBOL copybook; create a customized object model for each imported copybook; and then store the customized object model on a computer readable storage medium. The COBOL copybook, COBOL data set, object model and customized object model will be described in more detail below with reference to FIGS. 2 and 4.

At runtime, the system integrator 190 receives a COBOL data set from one of the database(s) 155, 165 and 175. The COBOL data set contains at least one instance of either an OCCURS DEPENDING ON clause (herein, "ODO clause") or a REDEFINE clause (herein, "RD clause"). The system integrator 190 automatically reads the COBOL data set into an object instance of the COBOL data set based on the mapping defined by the customized object model, including representations for ODO clauses and RD clauses. This formation of an object instance equivalent to a COBOL data set requires no custom programming. The system integrator 190 then stores the object instance on a computer readable storage medium.

Mainframe 150, 160 and 170

FIG. 2 illustrates a block diagram of an embodiment of a mainframe 150. Mainframe 150 is depicted in FIG. 2 only by way of example. In practice, mainframes 160 and 170 include more or less components and functionality than depicted in FIG. 2 and described below for mainframe 150.

In one embodiment, the mainframe 150 comprises a plurality of databases 220 as shown in FIG. 2. For example, the plurality of databases 220 is a plurality of databases similar to database 155. While the description below will focus on a single database 220, those skilled in the art will recognize that the other databases in the plurality of databases 220 include the same or similar functionality and components. Each database 220 further comprises one or more COBOL copybook(s) 230 (herein, "copybook 230") and one or more sets of COBOL data 240 (herein, "data 240").

Figure 11A:
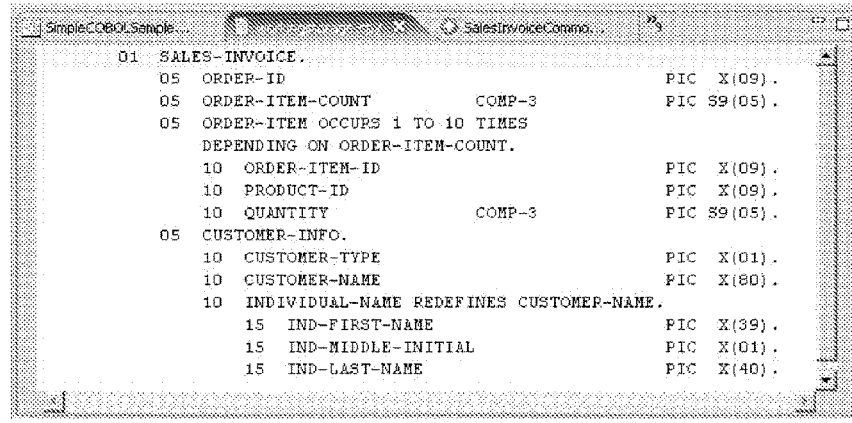
FIG. 11A is a graphical representation of an embodiment of a COBOL copybook including an instance of an OCCURS DEPENDING ON clause and an instance of a REDEFINE clause.
Figure 11B:
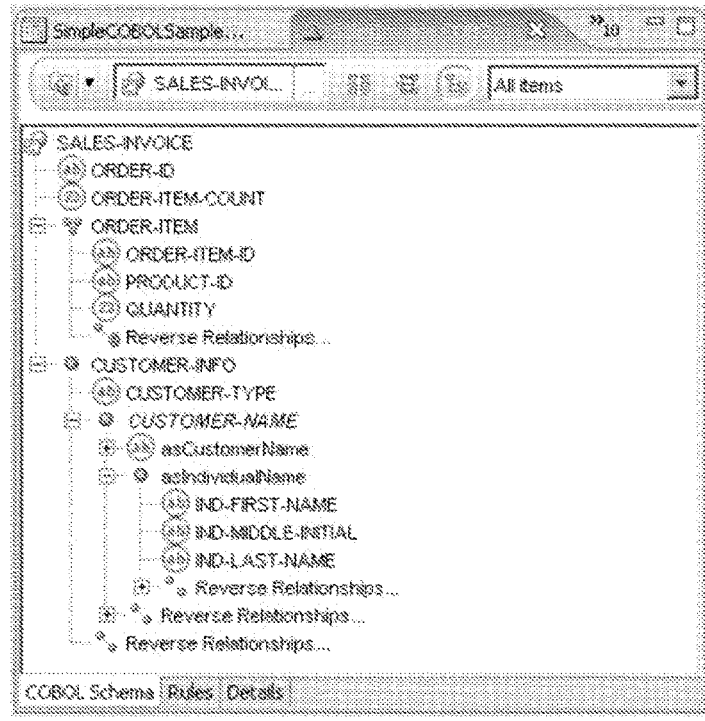
FIG. 11B is a graphical representation of an embodiment of a COBOL object model depicted as a tree illustration.
Figure 11C:
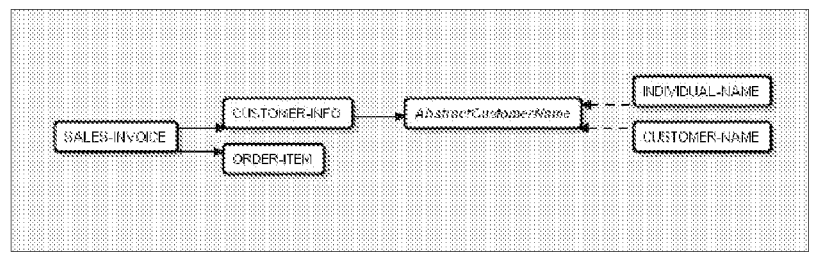
FIG. 11C is a graphical representation of an embodiment of a COBOL object model depicted as graph.
Figure 13:
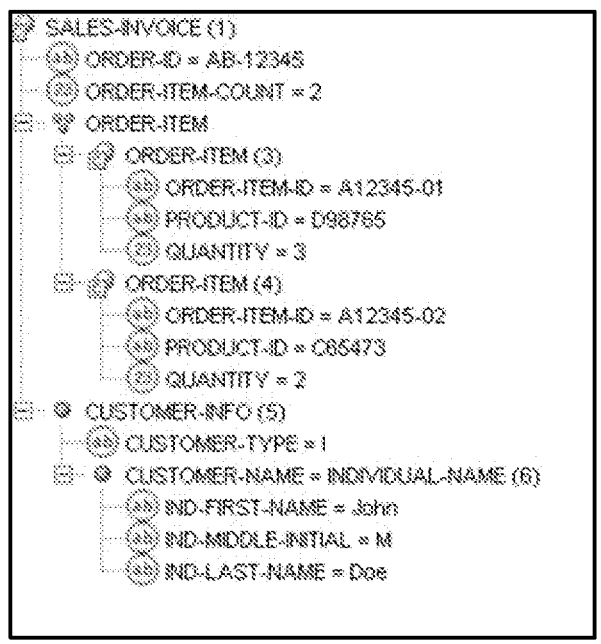
FIG. 13 is a graphical representation of an embodiment of a object instance of a COBOL data set.

The plurality of databases 220 is each a conventional, tangible database that stores sets (structured collections) of data 240. The sets of data 240 comprise COBOL computer code and COBOL data elements stored on a plurality of tangible computer-readable storage mediums (e.g., databases 155, 165 and/or 175). The sets of data 240 includes a set of COBOL fields, a set of COBOL groups and at least one instance of either an OCCURS DEPENDING ON clause or a REDEFINE clause. A COBOL group is a structured member of a record (a structured data type or parent group, containing groups and fields. For example, FIG. 11A depicts a graphical representation of an embodiment of a COBOL copybook including an instance of an OCCURS DEPENDING ON clause and an instance of a REDEFINE clause. The copybooks 230 include definitions for a subset of the COBOL groups in the sets of data 240. For example, FIG. 11B depicts a graphical representation of an embodiment of a COBOL object model depicted as a tree illustration and FIG. 11C depicts a graphical representation of an embodiment of a COBOL object model depicted as graph. Thus, each copybook 230 includes all the metadata necessary for building an object model for the subset of COBOL groups defined by the COBOL copybook. For example, FIG. 13 depicts a graphical representation of an embodiment of an object instance of a COBOL data set.

Optionally, the databases 220 also comprise (or are communicatively coupled to) a security device 260 to prevent unintended access to data and/or any combination of other conventional features that facilitate query processing such as a driver library 280 (comprising, e.g., ODBC drivers, JDBC drivers, ODBC-JDBC bridges, JDBC-ODBC bridges, etc.), an API library 290 (comprising, e.g., ODBC APIs, JDBC APIs, etc.), and/or an interface device 295.

Client 110

Figure 3:
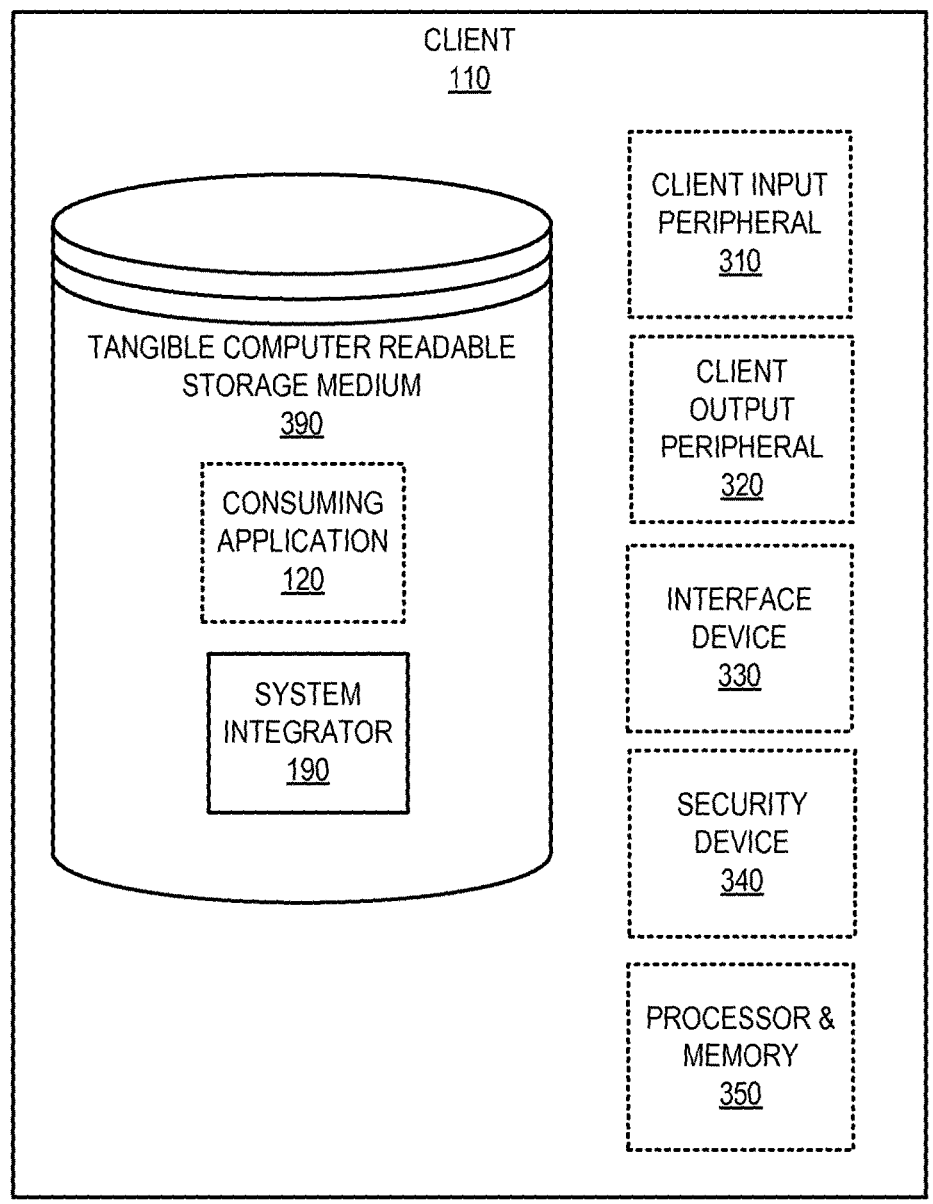
FIG. 3 is a block diagram of an embodiment of a client.

FIG. 3 is a block diagram of an embodiment of a client 110. The client 110 comprises a tangible computer-readable storage medium 390 including a system integrator 190. The storage medium 390 is a hard disk, flash memory or any similar computer-readable storage device. The system integrator 190 will be described in more detail below (See, e.g., FIG. 4).

Optionally, the client 110 can also comprise (or be communicatively coupled to) any combination of client input peripherals 310, client output peripherals 320, an interface device 330, a security device 340, a consuming application 120; and a processor & memory 350.

System Integrator 190

Figure 4:
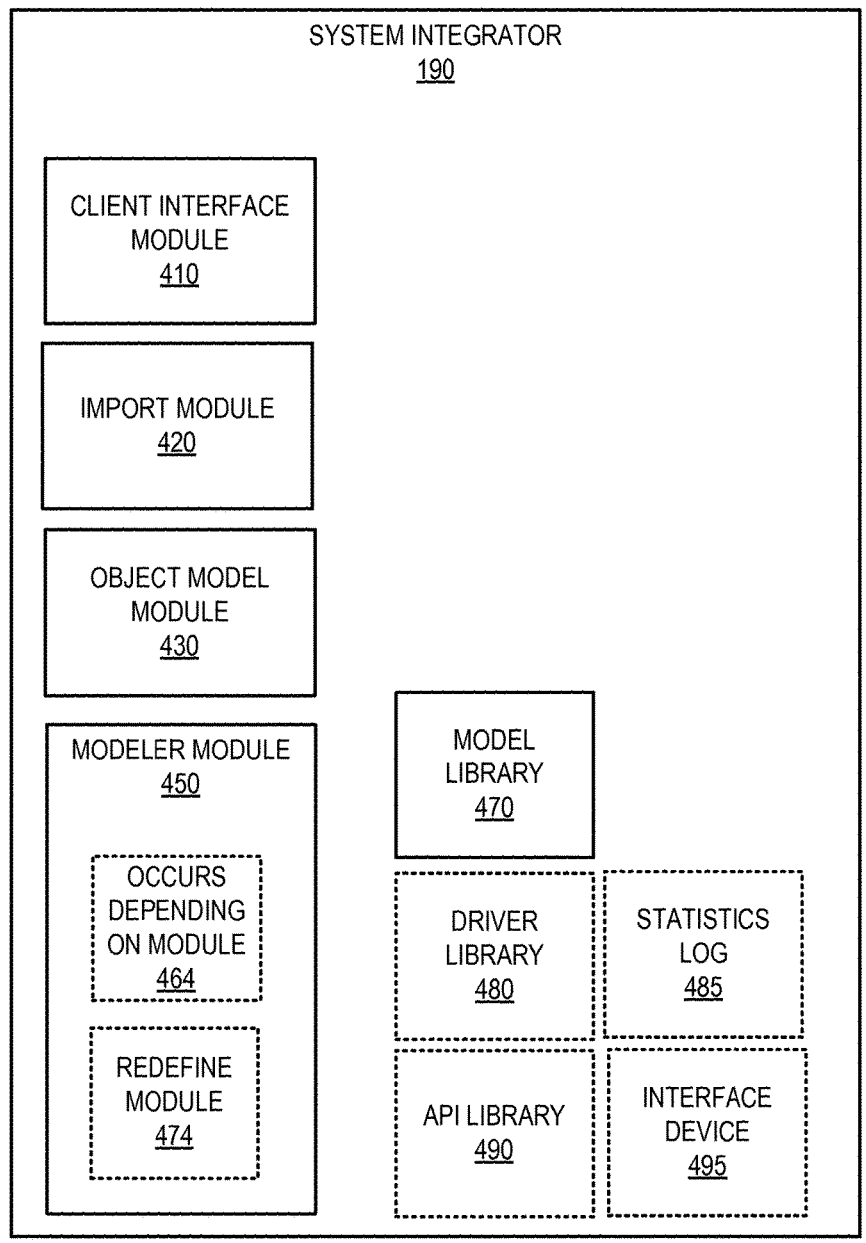
FIG. 4 is a block diagram of an embodiment of a system integrator.

Referring now to FIG. 4, one embodiment of the system integrator 190 is described. The system integrator 190 comprises a client interface module 410, an import module 420, an object model module 430 and modeler module 450. In some embodiments, the modeler module 450 further comprises an OCCURS DEPENDING ON module 464 (herein, "ODO module 464") and a REDEFINE module 474 (herein, "RD module 474"). In some embodiments, modules 410, 420, 430, 450, 464 and 474 comprise computer-readable computer code stored on a tangible computer-readable storage medium (e.g., storage medium 390). The system integrator 190 is communicatively coupled to a plurality of mainframes 150, 160 and 170 in a conventional manner.

Figure 12:
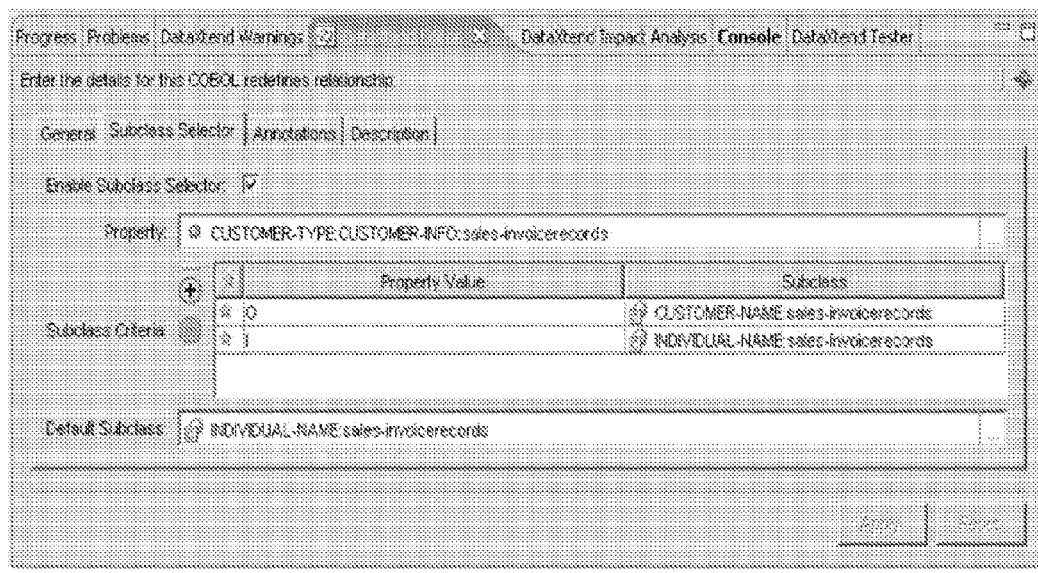
FIG. 12 is an embodiment of a user-interface for accessing the system integrator of the present invention to specify a set of REDEFINE criteria.

The client interface module 410 is adapted to receive input from a client 110. In one embodiment, the client interface module 410 is routines or software that controls the receipt of information, the generation and presentation of interfaces and the receipt of input data. For example, at a modeling stage the client interface module 410 generates a graphical user interface adapted to receive input from a human user, including dialog boxes and/or drop-down menus in which a human user of the client 110 specifies a copybook 230 to be imported from one or more of the database(s) 155, 165 and 175 and a set of REDEFINE criteria. For example, FIG. 12 depicts an embodiment of a user-interface for accessing the system integrator of the present invention to specify a set of REDEFINE criteria. Similarly, in one embodiment at a runtime stage the client interface module 410 generates a graphical user interface adapted to receive input from the human user, including dialog boxes and/or drop-down menus in which the human user of the client 110 specifies one or more sets of data 240 to be imported to the modeler module 450. The client interface module 410 is further adapted to communicate with the import module 420 and object model module 430. For example, the client interface module 410 sends the copybook selection to the import module 420 and the REDEFINE criteria to the object model module 430.

The import module 420 is adapted to communicate with the mainframes 150, 160 and 170. At a modeling stage, the import module 420 receives the copybook selection from the client interface module 410. The import module 420 then imports a copybook 230 by parsing the copybook 230 from one of the database(s) 155, 165 and 175. The import module 420 is further adapted to send the copybook 230 to the object model module 430. While the import module 420 is shown as being a separate module of the system integrator 190 in FIG. 4 from the client interface module 410, those skilled the art will recognize that in another embodiment, the import module 420 is part of the client interface module 410, or vice versa.

The object model module 430 is adapted to receive or retrieve the copybook 230 from the import module 420. The object model module 430 uses the copybook 230 to generate an object model for a subset of the COBOL groups defined by the copybook 230. The object model module 430 also receives a set of REDEFINE criteria from the client interface module 410. The object model module 430 uses the set of REDEFINE criteria and the generated object model to create a customized object model; and then stores the customized object model in the model library 470.

The model library 470 comprises a computer-readable storage medium (e.g., a flash drive, RAM, or any other tangible computer-readable medium). The model library 470 stores any number of object models including customized object models, object model instances or other information related to the object models. The model library 470 is adapted for communication with the object model module 430 and the modeler module 450.

The modeler module 450 is adapted for communication to receive/retrieve sets of data 240 from the database(s) 155, 165 and 175; access a stored customized object model corresponding to the set of data 240 in the model library 470;

form object instances of the set of data 240 based on the mapping specified by the customized object model; and then store the object instances in the model library 470. The set of data 240 is received as either a COBOL data file or as a COBOL byte stream from one or more of the database(s) 155, 165 and 175. In one embodiment, the modeler module 450 is adapted to access a message queue that is adapted to receive communications from one or more of the database(s) 155, 165 and 175. The modeler module 450 then receives a continuous COBOL byte stream from one or more of the database(s) 155, 165 and 175. The operation of the modeler module 450 will be described in more detail below with reference to FIGS. 6-8.

Optionally, the system integrator 190 can also comprise a driver library 480 (comprising, e.g., ODBC drivers, JDBC drivers, ODBC-JDBC bridges, JDBC-ODBC bridges, etc.), a statistics log 485, an API library 490 (comprising, e.g., ODBC API(s), JDBC API(s), etc.), and/or an interface device 495.

Figure 5A:
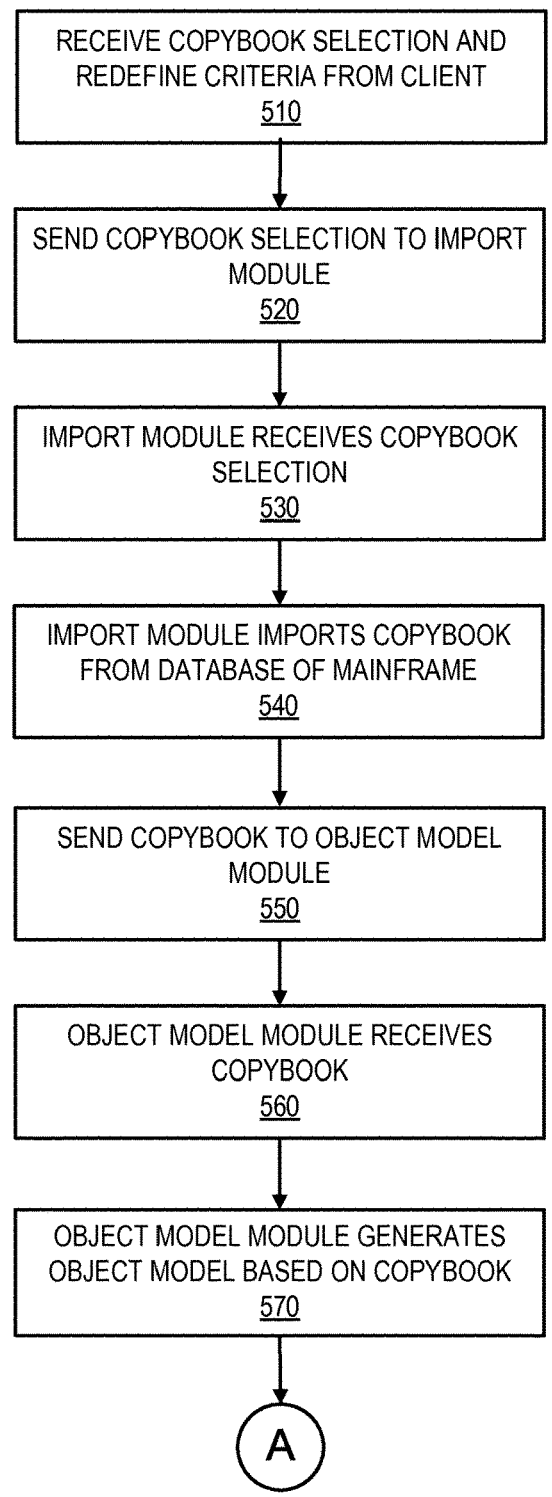
FIG. 5A is a flow chart of an embodiment of a method for generating an object model for a copybook.

Turning now to FIG. 5A, depicted is a flow chart of one embodiment of a method for generating an object model for the copybook 230. The process begins with the client interface module 410 receiving 510 a copybook selection from the user or client 110 specifying a copybook 230 to be imported from one of the database(s) 155, 165 and 175. The client interface module 410 also receives 510 a set of REDEFINE criteria from the user or client 110. Alternatively, in one embodiment, the copybook selection and the set of REDEFINE criteria are received 510 from the client 110 at different times (e.g., the set of REDEFINE criteria are received 510 at a time subsequent to the receipt 510 of the copybook selection). The client interface module 410 then sends 520 the copybook selection to the import module 420. The import module 420 receives 530 the copybook selection from the client interface module 410. The import module 420 then imports 540 the copybook 230 identified in the copybook selection from one of the database(s) 155, 165 and 175. Next, the import module 420 sends 550 the copybook 230 to the object model module 430. In other embodiments, the copybook is stored at the system integrator 190 and a pointer or reference to the copybook is provided to the object model module 430. The object model module 430 receives 560 the copybook 230 from the import module 420. The copybook 230 defines at least a subset of the COBOL groups within a set of data 240 that is received by the modeler module 450 at runtime. The object model module 430 then generates 570 an object model for the subset of the COBOL groups defined by the copybook 230. The object model corresponds to the set of data 240 that is received at runtime because it was generated based on a copybook 230 that defines at least a subset of the COBOL groups within the set of data 240. The object model is a set of objects and classes that represent some of the COBOL groups defined by the copybook 230. In one embodiment, the object model module 430 then stores the object model on the model library 470.

Figure 5B:
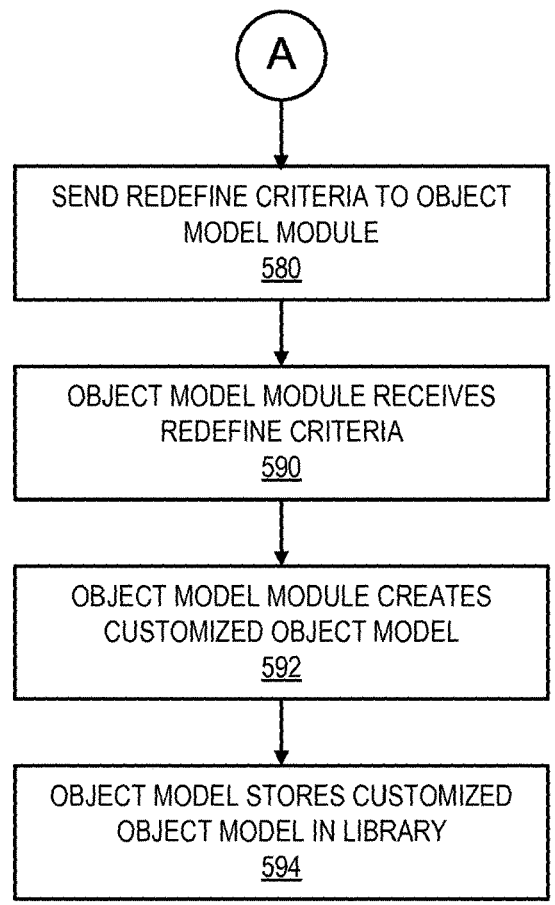
FIG. 5B is a flow chart of an embodiment of a method for creating a customized object model for the copybook.

Turning now to FIG. 5B, depicted is a flow chart of an embodiment of a method for creating a customized object model for the copybook 230. The method begins with the client interface module 410 sending 580 the set of REDEFINE criteria to the object model module 430. The set of REDEFINE criteria are those that were received in step 510 of FIG. 5A. The object model module 430 receives 590 the set of REDEFINE criteria from the client interface module 410. The object model module 430 then creates 592 a customized object model for the copybook 230 based on the set of REDEFINE criteria and the previously generated object model for the copybook 230. For example, the object model module 430 creates 592 a customized object model for the copybook 230 by modifying the previously generated object model to include metadata specifying definitions for identified instances of RD clauses and the conditions for applying these definitions to the instances of RD clauses that are identified in the set of data 240 received at runtime. The customized object model corresponds to the set of data 240 that is received at runtime because it was created based in part on an object model that corresponds to the set of data 240. Next the object model module 430 stores 594 the customized object model in the model library 470.

Figure 6:
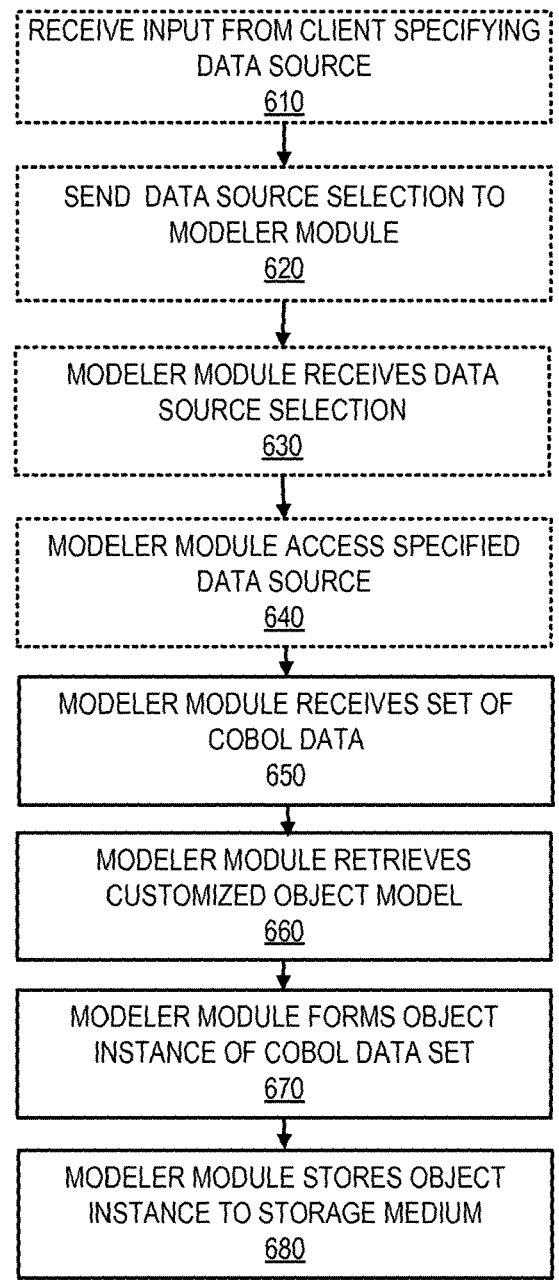
FIG. 6 is a flow chart of an embodiment of a method for forming an object instance of a COBOL data set.

Turning now to FIG. 6, depicted is a flow chart of one embodiment of a method for receiving a set of data 240 and forming an object instance of the set of data 240 based on the mappings specified by the customized object model. In one embodiment, the client interface module 410 receives 610 input from the user or client 110 specifying a data source from which to retrieve a set of data 240. For example, the client interface module 410 generates a graphical client interface adapted to receive input from a human user of the client 110 including dialog boxes and/or drop-down menus in which the human user selects/specifies a set of data 240 to be retrieved for the modeler module 450. The set of data 240 is either a specific set of COBOL data files stored on one or more of the databases 155, 165 and 175 or a message queue for receiving a continuous byte stream of COBOL data from one or more of the databases 155, 165 and 175. The client interface module 410 then sends 620 the data source selection to the modeler module 450. The modeler module 450 receives 630 the data source selection from the client interface module 410 and accesses 640 the data source. The modeler module 450 retrieves or receives 650 a set of data 240 from one or more of the databases 155, 165 and 175. The set of data 240 includes a plurality of COBOL fields, a plurality of COBOL groups, and at least one instance of either an ODO clause or a RD clause. The modeler module 450 then retrieves 660 a customized object model stored in the model library 470 that corresponds to the set of data 240. The customized object model corresponds to the set of data 240 because it was created based in part on an object model that corresponds to the set of data 240. As will be described in more detail with reference to FIGS. 7-8, the modeler module 540 then automatically reads the set of data 240 into the customized object model, thereby forming 670 an object instance of the set of data 240. The object instance of the set of data 240 includes proper representations for all instances of ODO clauses and RD clauses without the requirement for custom coding. The representations for instances of RD clauses are based on definitions specified by a human user of the client 110 when specifying the set of REDEFINE criteria. Thus, the definitions for instances of RD clauses are customized based on criteria specified by a human user of the client 110. The modeler module 450 then stores 680 the object instance in the model library 470.

For example, in one embodiment the modeler module 450 receives 650 a set of data 240 including data elements qualified by an RD clause. The data elements qualified by the RD clause are received 650 as abstract classes with a subclass for each definition. The class corresponding to the containing group has a relationship to the abstract class corresponding to the abstract, first definition. The set of data 240 received 650 by the modeler module 450 also includes data elements qualified by an ODO clause. The data elements qualified by the ODO clause are received 650 as collection members with additional metadata that binds the collection cardinality to the controlling numeric value of the ODO clause. At a modeling stage, the client interface module 410 received 510 a set of REDEFINE criteria from a human user of the client 110. The set of REDEFINE criteria specifies a prior sibling member to be used as a control along with a map of value/definition pairs for each instance of a RD clause. The object model module 430 receives 590 the set of REDEFINE criteria 590 from the client interface module 410. The object model module 430 then creates 592 a customized object model that includes the set of REDEFINE criteria 590. The set of data 240 is then read into the customized object model, thereby forming 670 an object instance of the set of data 240.

In an alternate embodiment, the modeler module 450 retrieves 660 an object model (instead of a customized object model) stored in the model library 470 that corresponds to the set of data 240. The object model corresponds to the set of data 240 because it was generated based on a copybook 230 that defines at least a subset of the COBOL groups within the set of data 240. The modeler module 450 then automatically reads the set of data 240 into the object model, thereby forming 670 an object instance of the set of data 240. The object instance of the set of data 240 includes proper representations for instances of ODO clauses and RD clauses without the requirement for custom coding. The representations for instances of RD clauses are based on the definition specified by each RD clause. Thus, the definitions for instances of RD clauses are not customized based on criteria specified by a human user of the client 110. This particular embodiment therefore provides enhanced computational efficiency when the set of data 240 contains instances of ODO clauses but does not contain RD clauses, or any other time when there is no requirement that instances of RD clauses in the set of data 240 be customized based on criteria specified by a human user of the client 110. The modeler module 450 then stores 680 the object instance in the model library 470.

A person having ordinary skill in the art will recognize that in some cases the set of data 240 will contain groups defined by a plurality of copybooks 230. In such cases the modeler module 450 reads the set of data 240 into a plurality of customized object models (and/or object models) for a plurality of copybooks 230, thereby forming 670 an object instance of the set of data 240.

Figure 7:
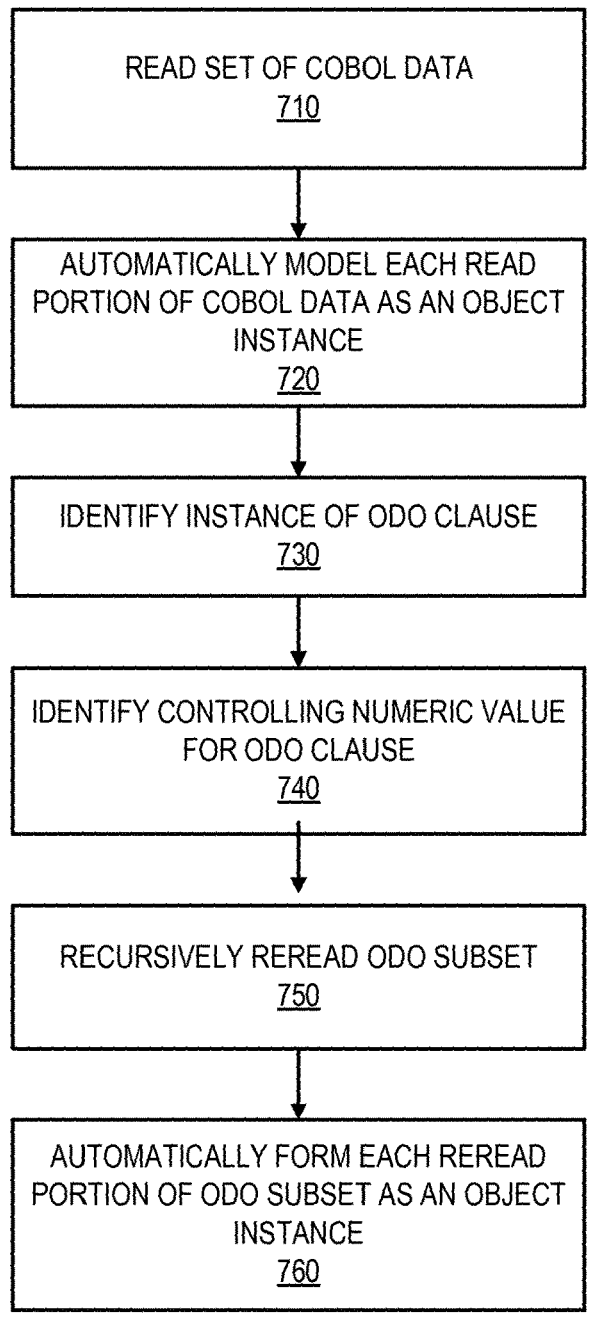
FIG. 7 is a flow chart of an embodiment of a method for forming an object instance of a set of COBOL data including an instance of an OCCURS DEPENDING ON clause.

Turning now to FIG. 7, depicted is a flow chart of one embodiment of a method for forming an object instance of the set of data 240 including an instance of an OCCURS DEPENDING ON clause. The process begins with the modeler module 450 reading 710 the set of data 240. Then the modeler module 450 automatically models 720 read portions of the set of data 240 as corresponding portions of an object instance of the set of data 240 based on the customized object model. The modeler module 450 then identifies 730 an instance of an ODO clause in the set of data 240. The ODO clause is a COBOL construct that specifies the number of times that an ODO subset of data 240 occurs. An ODO subset of data 240 is either a COBOL group qualified by an ODO clause or a COBOL field qualified by an ODO clause. The modeler module 450 then reads back the previously read portions of the set of data 240 to identify 740 the controlling numeric value for the ODO clause. The modeler module 450 knows the location of the controlling numeric value based on the previously customized object model. The modeler module 450 then recursively rereads 750 the ODO subset based on the controlling numeric value. As the modeler module 450 rereads 750 each portion of the ODO subset it automatically forms 760 each reread portion of the ODO subset as a corresponding portion of an object instance of the ODO subset based on the customized object model. Alternatively, in one embodiment, steps 710-760 are performed by the ODO module 464. A person having ordinary skill in the art will recognize that the above steps 710-760 can be performed by the evaluator module 450 using an object model instead of a customized object model.

Figure 8:
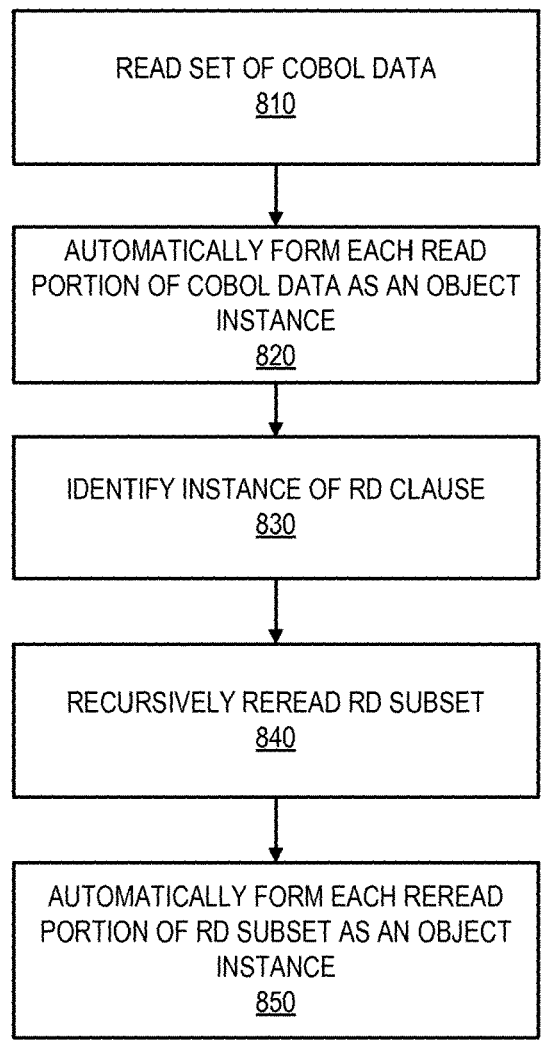
FIG. 8 is a flow chart of an embodiment of a method for forming an object instance of a set of COBOL data including an instance of a REDEFINE clause.

Turning now to FIG. 8, depicted is a flow chart of one embodiment of a method for forming an object instance of a set of COBOL data including an instance of a REDEFINE clause. First, the modeler module 450 reads 810 the set of data 240. The modeler module 450 automatically forms 820 read portions of the set of data 240 as corresponding portions of an object instance of the set of data 240 based on the customized object model. The modeler module 450 identifies 830 an instance of an RD clause in the set of data 240. The RD clause is a COBOL construct that specifies a new definition (i.e., a definition different than the one specified by the COBOL copybook 230) for a RD subset of the data 240. An RD subset of data 240 is either a COBOL group that is newly defined by an RD clause or a COBOL field that is newly defined by an RD clause. The modeler module 450 automatically knows the new definition for the RD subset based on REDEFINE criteria incorporated in the customized object model. For example, the modeler module 450 encounters a field or group that has been redefined. The modeler module 450 then finds the controlling value for the encountered field or group based on the customized object model and looks up the new definition for the found value. The modeler module 450 then recursively rereads 840 the RD subset based on the new definition. As the modeler module 450 rereads 840 each portion of the RD subset it automatically forms 850 each reread portion of the RD subset as a corresponding portion of an object instance of the RD subset based on the customized object model. Alternatively, in one embodiment, steps 810-850 are performed by the RD module 474.

A person having ordinary skill in the art will recognize that the above steps 810-850 can be performed by the modeler module 450 using an object model instead of a customized object model. However, because the object model is not based in part on the set of REDEFINE criteria the modeler module 450 forms 850 object instances of the set of data 240 based on the definitions inherent in the copybook 230. For example, in one embodiment, modeler module 450 sets the new definition for the qualified data element for the RD subset as the first definition specified by the copybook 230. If the first definition does not work, then the modeler module 450 sets the new definition for the qualified data element for the RD subset as the first definition that can read the data element successfully into its definition.

Figure 9:
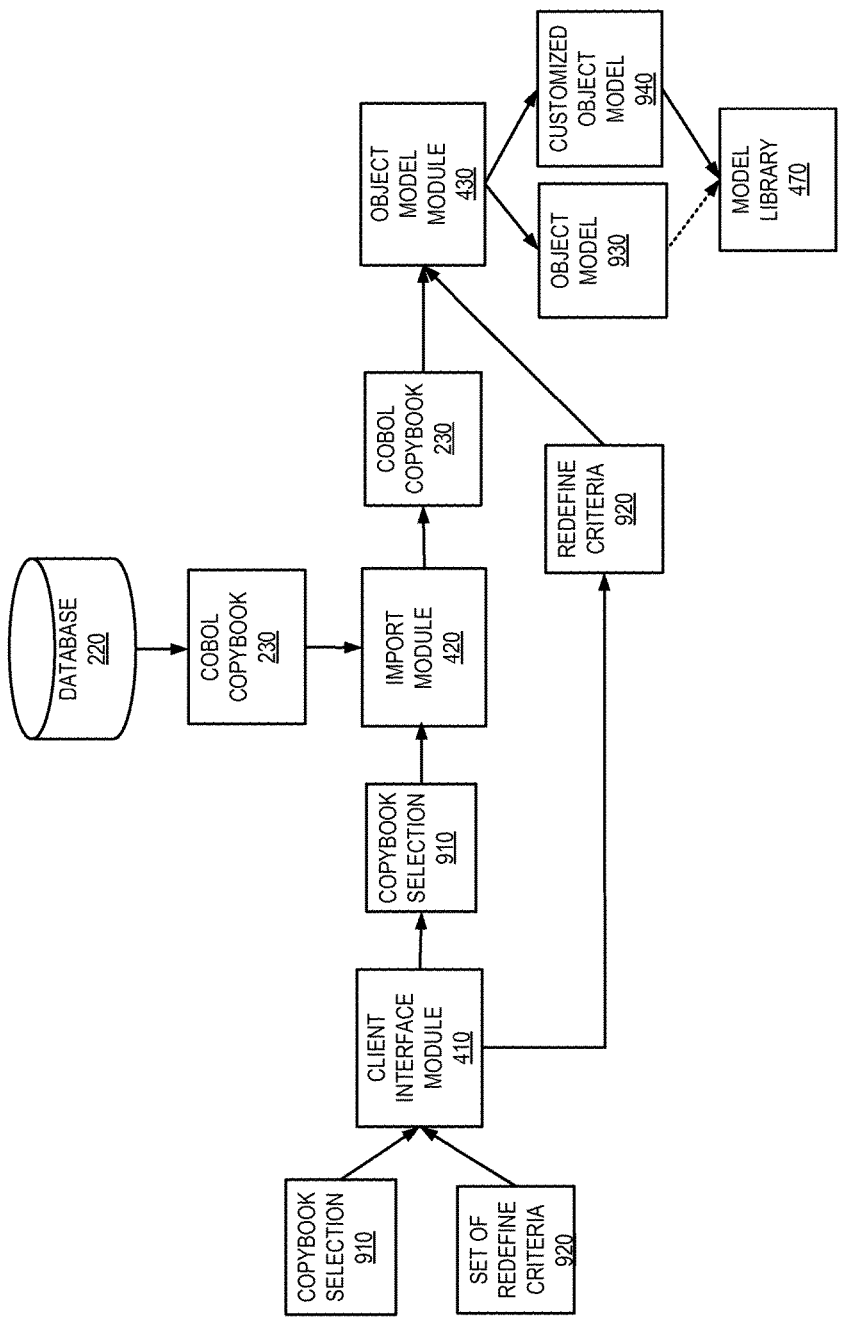
FIG. 9 is a flow diagram of an embodiment of a transformative process for receiving a copybook selection and a set of REDEFINE criteria and producing a custom object model.

Turning now to FIG. 9, depicted is a flow diagram of one embodiment of a transformative process for receiving a copybook selection and a set of REDEFINE criteria and producing a customized object model. The client interface module 410 receives a copybook selection 910 and a set of REDEFINE criteria 920. The client interface module 410 sends the copybook selection 910 to the import module 420. The import module 420 receives the copybook selection 910. The import module 420 imports the copybook 230 from the database 220 based on the copybook selection 910. The import module 420 sends the copybook 230 to the object model module 430. The object model module 430 generates an object model 930 based on the copybook 430. In some embodiments, the object model module 430 then stores the object model in the model library 470. The client interface module 410 sends the set of REDEFINE criteria 920 to the object model module 430. The object model module 430 modifies the object model 930 to create a customized object model 940 including the set of REDEFINE criteria 920. The object model module 430 then stores the customized object model 940 in the model library 470.

Figure 10:
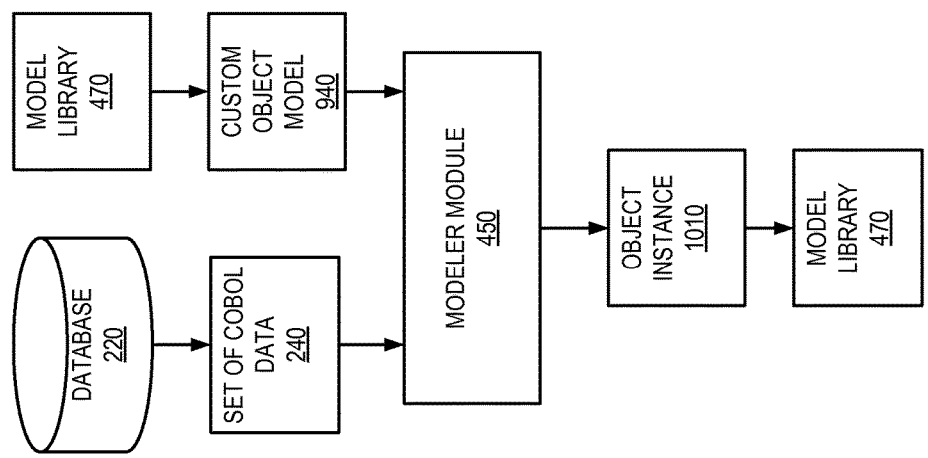
FIG. 10 is a flow diagram of an embodiment of a transformative process for receiving a set of COBOL data and a custom object model, and forming an object instance of the set of COBOL DATA.

Turning now to FIG. 10, depicted is a flow diagram of one embodiment of a transformative process for receiving a set of data 240 and a customized object model 940, and forming an object instance of the set of data 240. The modeler module 450 receives a set of data 240 from a database 220. The modeler module 150 then retrieves a customized object model 940 from the model library 470. The customized object model 940 corresponds to the set of data 240 as described above for FIGS. 5A, 5B and 6. The modeler module 450 forms an object instance 1010 of the set of data 240 as described above for FIGS. 6-8. The modeler module 450 then stores the object instance 1010 in the model library 470.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A system comprising:
a non-transitory computer-readable medium comprising computer-executable code stored therein, the computer-executable code being executable by one or more processors for:
generating an interface for receiving a copybook selection;
importing a copybook from a database, the copybook corresponding with a set of COBOL data stored in the database that includes a REDEFINE clause;
creating an object model for the copybook;
storing the object model in a model library;
receiving the set of COBOL data; and
forming, based at least in part on the received set of COBOL data, an object instance that is equivalent to the set of COBOL data, the object instance including one or more representations for a complete set of one or more properties included in the REDEFINE clause without requiring custom coding for the forming of the object instance;
retrieving the object model from the model library;
reading the set of COBOL data;
identifying an instance of the REDEFINE clause and automatically forming the REDEFINE clause as the object instance.

2. The system of claim 1 wherein the computer-executable code is further executable by the one or more processors for:
creating an object model for the copybook;
storing the object model in a model library;
generating an interface for receiving dynamic COBOL construct criteria;
receiving the dynamic COBOL construct criteria; and
providing the dynamic COBOL construct criteria to a client interface.

3. The system of claim 2 wherein the computer-executable code is further executable by the one or more processors for:
creating a customized object model for the copybook using the dynamic COBOL construct criteria; and
storing the customized object model in the model library.

4. The system of claim 1 wherein the computer-executable code is further executable by the one or more processors for:
forming the object instance using the customized object model from the model library.

5. The system of claim 1 wherein the computer-executable code is further executable by the one or more processors for:
identifying a controlling numeric value for a dynamic COBOL construct clause;
identifying an instance of the dynamic COBOL construct clause affecting a dynamic COBOL construct subset;
recursively rereading the dynamic COBOL construct subset based at least in part on a new definition specified by the customized object model; and
automatically forming each reread portion of the dynamic COBOL construct subset as the object instance.

6. The system of claim 5 wherein the dynamic COBOL construct clause is a member of a group consisting of an OCCURS DEPENDING ON clause and a REDEFINE clause.

7. The system of claim 1, wherein the set of COBOL data is a COBOL data file.

8. The system of claim 1, wherein the set of COBOL data is a COBOL byte stream.

9. The system of claim 1 wherein the computer-executable code is further executable by the one or more processors for:
receiving input specifying a data source and the set of COBOL data is received from the specified data source.

10. A method comprising:
performing by executing code stored in a memory with a processor of a computer system to transform the computer system into a machine to integrate legacy COBOL data structures to object instances for object-oriented computer systems:
generating an interface for receiving a copybook selection;

importing a copybook from a database, the copybook corresponding with a set of COBOL data stored in the database that includes a REDEFINE clause;
creating an object model for the copybook;
storing the object model in a model library;
receiving the set of COBOL data; and
forming, based at least in part on the received set of COBOL data, an object instance that is equivalent to the set of COBOL data, the object instance including one or more representations for a complete set of one or more properties included in the REDEFINE clause without requiring custom coding for the forming of the object instance;
retrieving the object model from the model library;
reading the set of COBOL data;
identifying an instance of the REDEFINE clause and automatically forming the REDEFINE clause as the object instance.

11. The method of claim 10 further performing by executing the code stored in the memory with the processor:
creating an object model for the copybook;
storing the object model in a model library;
generating an interface for receiving dynamic COBOL construct criteria;
receiving the dynamic COBOL construct criteria; and
providing the dynamic COBOL construct criteria to a client interface.

12. The method of claim 11 further performing by executing the code stored in the memory with the processor:
creating a customized object model for the copybook using the dynamic COBOL construct criteria; and
storing the customized object model in the model library.

13. The method of claim 10 further performing by executing the code stored in the memory with the processor:
forming the object instance using the customized object model from the model library.

14. The method of claim 10 further performing by executing the code stored in the memory with the processor:
identifying a controlling numeric value for a dynamic COBOL construct clause;
identifying an instance of the dynamic COBOL construct clause affecting a dynamic COBOL construct subset;
recursively rereading the dynamic COBOL construct subset based at least in part on a new definition specified by the customized object model; and
automatically forming each reread portion of the dynamic COBOL construct subset as the object instance.

15. The method of claim 14 wherein the dynamic COBOL construct clause is a member of a group consisting of an OCCURS DEPENDING ON clause and a REDEFINE clause.

16. The method of claim 10, wherein the set of COBOL data is a COBOL data file.

17. The method of claim 10, wherein the set of COBOL data is a COBOL byte stream.

18. The method of claim 10 further performing by executing the code stored in the memory with the processor:
receiving input specifying a data source and the set of COBOL data is received from the specified data source.

19. A non-transitory, computer readable medium that comprises a computer readable program to integrate legacy COBOL data structures to object instances for object-oriented computer systems, wherein the computer readable program when executed on a computer transforms the computer into a machine and causes the computer to perform:
generating an interface for receiving a copybook selection;
importing a copybook from a database, the copybook corresponding with a set of COBOL data stored in the database that includes a REDEFINE clause;
creating an object model for the copybook;
storing the object model in a model library;
receiving the set of COBOL data; and
forming, based at least in part on the received set of COBOL data, an object instance that is equivalent to the set of COBOL data, the object instance including one or more representations for a complete set of one or more properties included in the REDEFINE clause without requiring custom coding for the forming of the object instance;
retrieving the object model from the model library;
reading the set of COBOL data;
identifying an instance of the REDEFINE clause and automatically forming the REDEFINE clause as the object instance.

20. The non-transitory, computer readable medium of claim 19 wherein the computer readable program when executed on the computer further causes the computer to perform:
creating an object model for the copybook;
storing the object model in a model library;
generating an interface for receiving dynamic COBOL construct criteria;
receiving the dynamic COBOL construct criteria; and
providing the dynamic COBOL construct criteria to a client interface.

21. The non-transitory, computer readable medium of claim 20 wherein the computer readable program when executed on the computer further causes the computer to perform:
creating a customized object model for the copybook using the dynamic COBOL construct criteria; and
storing the customized object model in the model library.

22. The non-transitory, computer readable medium of claim 19 wherein the computer readable program when executed on the computer further causes the computer to perform:
forming the object instance using the customized object model from the model library.

23. The non-transitory, computer readable medium of claim 19 wherein the computer readable program when executed on the computer further causes the computer to perform:
identifying a controlling numeric value for a dynamic COBOL construct clause;
identifying an instance of the dynamic COBOL construct clause affecting a dynamic COBOL construct subset;
recursively rereading the dynamic COBOL construct subset based at least in part on a new definition specified by the customized object model; and
automatically forming each reread portion of the dynamic COBOL construct subset as the object instance.

24. The non-transitory, computer readable medium of claim 23 wherein the dynamic COBOL construct clause is a member of a group consisting of an OCCURS DEPENDING ON clause and a REDEFINE clause.

25. The non-transitory, computer readable medium of claim 19, wherein the set of COBOL data is a COBOL data file.

26. The non-transitory, computer readable medium of claim 19, wherein the set of COBOL data is a COBOL byte stream.

27. The non-transitory, computer readable medium of claim 19 wherein the computer readable program when executed on the computer further causes the computer to perform:
   receiving input specifying a data source and the set of COBOL data is received from the specified data source.

\* \* \* \* \*